United States Patent [19]
Gusmano

[11] Patent Number: 5,204,761
[45] Date of Patent: Apr. 20, 1993

[54] PIXEL BY PIXEL OFFSET AND GAIN CORRECTION IN ANALOG DATA FROM SCANNING ARRAYS

[75] Inventor: Donald J. Gusmano, Henrietta, N.Y.

[73] Assignee: Xerox Corporation, Stamford, Conn.

[21] Appl. No.: 670,829

[22] Filed: Mar. 18, 1991

[51] Int. Cl.[5] .............................................. H04N 1/40
[52] U.S. Cl. .................................... 358/461; 358/406; 358/471
[58] Field of Search ............... 358/406, 443, 446, 461, 358/464, 475, 163, 167, 471, 482, 483, 213.11, 213.15, 212

[56] References Cited

U.S. PATENT DOCUMENTS

| | | | |
|---|---|---|---|
| 4,216,503 | 8/1980 | Wiggins | 358/280 |
| 4,314,281 | 2/1982 | Wiggins et al. | 358/280 |
| 4,602,291 | 7/1986 | Temes | 358/221 |
| 4,639,781 | 1/1987 | Rucci et al. | 358/163 |
| 4,660,082 | 4/1987 | Tomohisa et al. | 358/163 |
| 4,698,685 | 10/1987 | Beaverson | 358/213.15 |
| 4,757,389 | 7/1988 | Clark et al. | 358/406 |
| 4,803,556 | 2/1989 | Beikirch | 358/475 |
| 4,903,144 | 2/1990 | Stefanik et al. | 358/461 |
| 4,920,428 | 4/1990 | Lin et al. | 358/461 |

Primary Examiner—Edward L. Coles, Sr.
Assistant Examiner—Thomas D. Lee
Attorney, Agent, or Firm—Mark Costello

[57] ABSTRACT

Method and apparatus for a correction of photosite offset and gain in the analog domain. Correction of offset and gain in the analog domain, prior to conversion of the analog signals to digital signals, allows the use of the maximum dynamic range of the system for pixel information, once the image is converted.

3 Claims, 5 Drawing Sheets

PIXEL BY PIXEL OFFSET AND GAIN CORRECTION IN ANALOG DATA FROM SCANNING ARRAYS

The present invention relates generally to a system for providing a wide range of correction for offset and gain in analog image data from an electronic scanning array.

BACKGROUND OF THE INVENTION

In electronic input scanners for document scanning, image information is acquired by sensing light from an image at an array of photosites arranged across a path of relative movement of the array and the image. The photosites, typically photodiodes or amorphous silicon sensors, are formed on a semiconductor substrate or chip, with a number of chips butted or otherwise arranged closely together to form the array. The photosite array may provide a 1:1 correspondence of photosites to the width of the actual image (a full width array), or may rely on optics to reduce the apparent image size to correspond to a smaller array. This array is usually a single chip. In use, a photosite produces an output signal proportional to light intensity detected at the photosite.

Responsivity at the photosites is measured against a standard value. Gain is a measure of sensitivity of the photosite to light and is the slope of the curve of light intensity (x-axis) versus output voltage (y-axis). Offset indicates the voltage output of the photosite at zero light intensity, or constitutes the y-axis intercept of the light intensity curve. These values have a tendency to vary somewhat from photosite to photosite within a range of values. Uniformity is desirable to avoid a streaking response.

A typical output signal from an array of photosites is offset from correct values by two types of offsets. The first type of offset is an output or line level offset, where the entire scan line of pixels is shifted with respect to a reference by some D.C. voltage level. There are numerous methods for correcting this offset, all of which apply the same D.C. correction factor to each pixel.

The second type of offset is a pixel-to-pixel variation in response, caused by several factors, the most important of which is photodiode leakage current. Typically, this offset value is small, e.g., a CCD photodiode having an integration time of 1 msec. may have an offset voltage of a maximum of 1 millivolt. However, if the maximum output signal is also low, e.g., under 300 millivolts, then this offset starts to become noticeable. This is particularly true if the CCD is operated under a wide range of temperature variations, since leakage current increases with increasing temperatures.

Pixel to pixel gain correction corrects for differences in pixel to pixel response due to non-uniformities in illumination profile, lens fall off, variations in CCD pixel to pixel response, etc. By correcting for these non-uniformities in the analog domain, the dynamic range of the system can be preserved, because each pixel will have the same dynamic range before being converted to a digital signal. Looking at the problem in another way, the closer that the zero value for the range of pixel values can be brought to the reference value (in this case, black), the finer the resolution to cover the range of possible pixel values to the maximum value (white).

U.S. Pat. No. 4,698,685 to Beaverson shows an arrangement which provides a gain correction for each pixel in an array. Gain values are stored for each pixel in an electronic storage device. As data is acquired by the array and directed to an image processor, each incoming pixel value is multiplied by a selected gain correction value to produce a gain corrected output. U.S. Pat. No. 4,639,781 to Rucci et al. shows that distortions in a video signal may be corrected by applying a continuous gain adjustment to the video information generated at the pixels and dynamically changing the gain factors on a line by line basis. U.S. Pat. No. 4,660,082 to Tomohisa et al., teaches that calibration and shading correction of image data may be corrected in synchronism with input scanning by comparison to a density reference value. U.S. Pat. No. 4,216,503 to Wiggins shows deriving offset and gain values from the sensor, storing those values and subsequently using those values for signal correction. U.S. Pat. No. 4,314,281 to Wiggins et al. teaches providing a compensation signal compensating for variations in light to which the sensors are subjected and deriving the compensation signal over a group of pixels, by taking an average response from the group as the group is exposed to a test pattern. U.S. Pat. No. 4,602,291 to Temes teaches a multimode pixel correction scheme which includes correction for pixel offset and gain. U.S. Pat. No. 4,920,428 to Lin et al. teaches the use of an attribute value in conjunction with a gain or offset correction to determine a shift of the correction values, thereby increasing the effective range of correction.

SUMMARY OF THE INVENTION

In accordance with the invention there is provided a method and apparatus for a correction of pixel to pixel photosite offset and gain in the analog domain.

In accordance with one aspect of the invention, in an input scanning device, having a scanning array with a plurality of photosites each detecting light from an image, each photosite in the array producing a response (a pixel) indicative of light intensity, offset correction is provided for analog pixel values, including a memory storing measured digital offset correction values, and an arrangement applying the appropriate digital offset correction values to analog image data. A calibration arrangement is provided, which during a calibration mode of scanner operation, derives digital offset calibration values for each photosite in the array.

In accordance with another aspect of the invention, the arrangement applying the appropriate derived offset digital correction values to analog image data, includes a digital to analog converter, receiving the digital offset correction values at the digital input, which applies analog correction values as a sinking signal to the analog image data at the analog output.

In accordance with still another aspect of the invention, in an input scanning device, having a scanning array with a plurality of photosites each detecting light from an image, each photosite in the array producing a response (a pixel) indicative of light intensity, gain correction is provided for analog pixel values, including a memory storing derived digital gain correction values, means for adding a preselected bias voltage to the analog image data, means for applying the gain correction to the combination of the bias voltage and the analog image data, and means for separating from the gain corrected data the component due to the addition of the bias voltage. The arrangement further includes an arrangement for determining the gain associated with each photosite, the gain determined by comparison of each photosite response during a calibration period with the minimum acceptable response.

Correction of offset in the analog domain, prior to conversion of the analog signals to digital signals, allows the use of the maximum dynamic range of the system for pixel information, once the image is converted.

With respect to gain correction, the present invention avoids standard methods of correction of multiplication of the video signal by a gain correction value. Standard methods of gain correction seek to increase pixel values, so that each photosite produces a pixel that is the same as the photosite having the maximum response. The present invention seeks instead to match operation of each photosite to the photosite having the minimum gain response, by dividing pixel values downwardly, so that upon conversion of analog data to digital data, a maximum dynamic range is obtained. The inventive arrangement therefore allows a larger correction range with the same amount of correction data.

These and other aspects of the invention will become apparent from the following description used to illustrate a preferred embodiment of the invention read in conjunction with the accompanying drawings in which:

FIG. 1 demonstrates a somewhat schematic diagram of an image scanner possibly incorporating the present invention;

Digital image information in the form of image data picture elements, (hereinafter, pixels), digital voltage representations of image intensity at discrete locations in an image, is provided from a suitable source. For example, the image data pixels may be obtained through line by line scanning of an image bearing original by one or more photosensitive imaging devices, such as an array of photosites. Image data pixels constitute the response of photosites indicating the intensity of light detected at the photosites over a given period. Line by line scanning of an image bearing original for the derivation of image information (image data pixels) is well known and does not form a part of the present invention.

Figure 1:
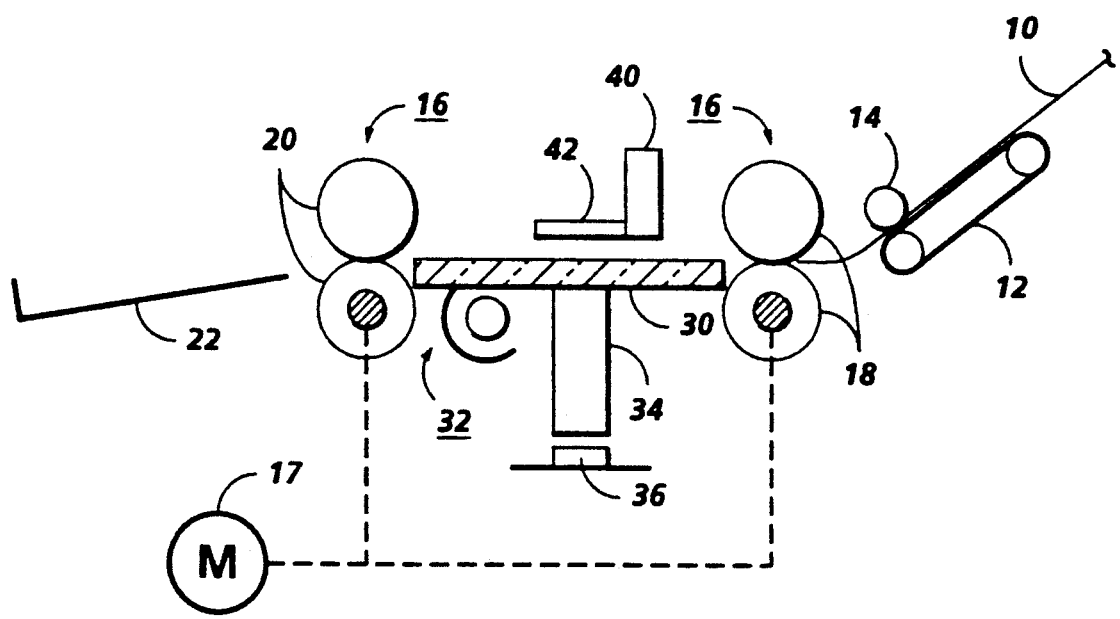

With reference now to the drawings where the showings are for the purpose of illustrating a preferred embodiment of the invention and not for limiting same, in an application incorporating the present invention, FIG. 1 shows one possible embodiment of a line by line image scanning device. Input tray 10 supports documents for feeding to an image position, via center retard belt feeder 12 and corresponding nip roll 14. Documents to be scanned are directed to a constant velocity transport (CVT) 16, driven by motor 17 drivingly connected thereto via pulley drives (not shown), for transports of sheets across a scanning position. Documents are initially engaged by CVT 16, at a first set of rolls 18, which drive the sheet across an imaging position to a second set of rolls 20, which engage the documents until they are ejected into an output tray 22.

An imaging position is defined by an imaging platen 30, which supports documents during the imaging process, an illuminator 32 typically comprising a lamp and reflector, a SELFOC lens 34 (SELFOC is a trademark of the Nippon Glass Co, for its fiber array lens), which directs light from illuminator 32 reflected from a document being scanned to a sensor array 36, in this case a CCD array of sensors. A start of scan detector (or registration detector) 40 signals the system when a lead edge of a document is entering the imaging position, and a white calibration strip 42 is provided at a position for imaging by sensor array 36, when a document is not interposed between the the sensor array and calibration strip 42.

Figure 2A:
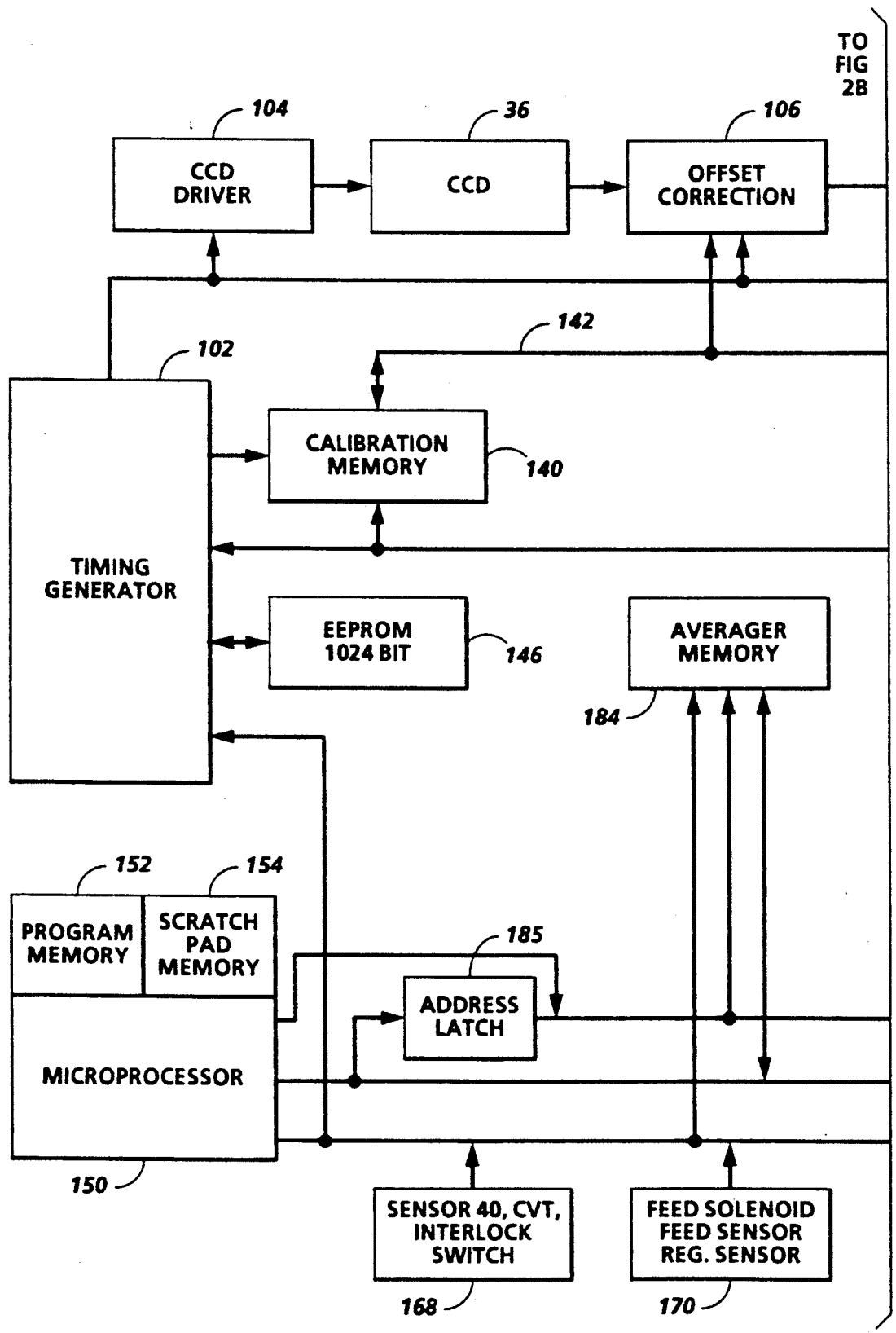
FIGS. 2A and 2B show a block diagram illustrating the image processing system in which the present invention finds use.
Figure 2B:
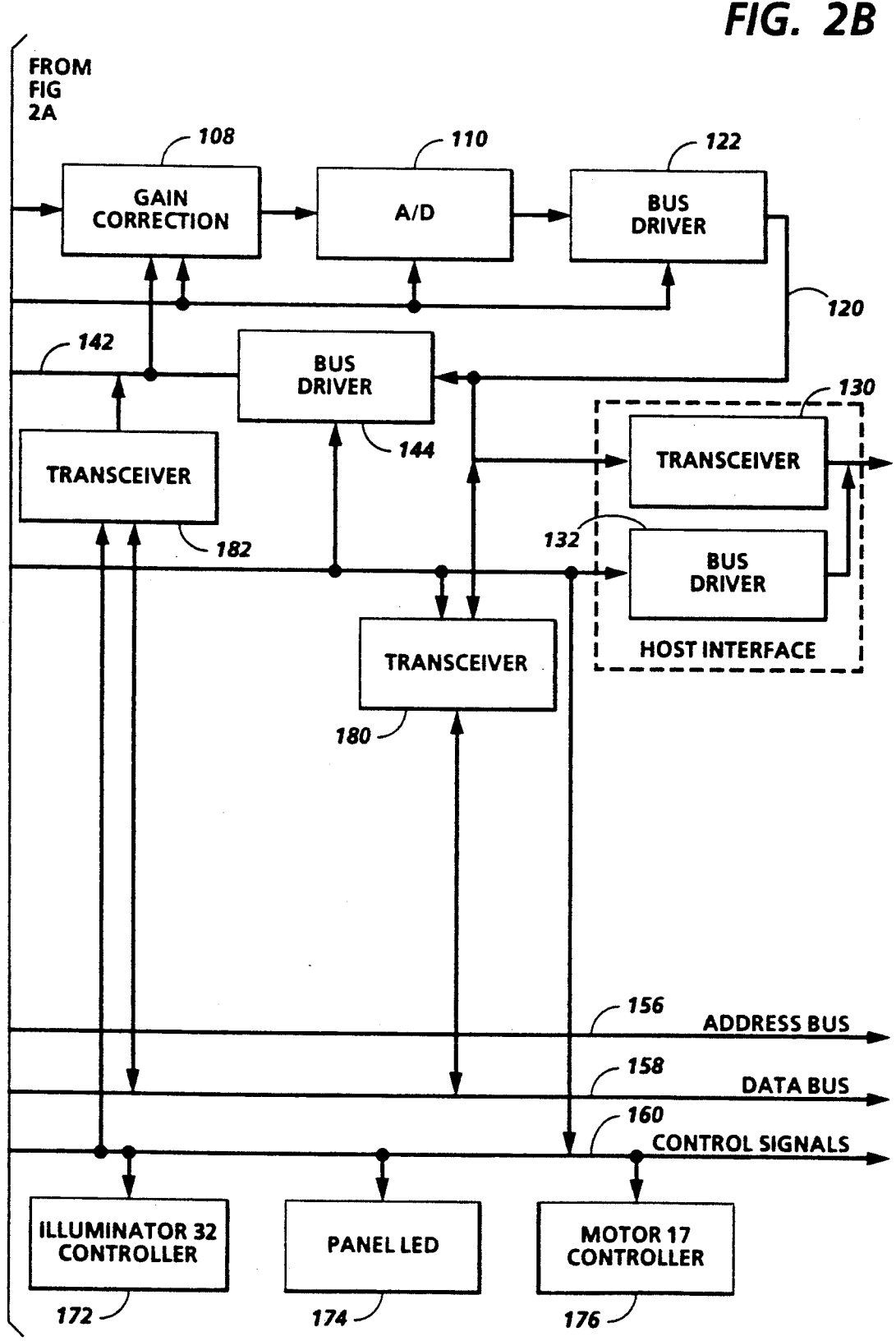

With reference now to FIGS. 2A and 2B, CCD array 36 is driven into an integrating condition periodically, in accordance with signals from a timing generator 102, and CCD driver 104. Analog values (small analog voltages) representing pixels or image data from each photosite are derived from CCD sensor array 36, and upon derivation, are directed to offset corrector 106 and gain corrector 108, as will be further explained hereinbelow. The analog pixel values are then converted to digital values at analog-to-digital (A/D) converter 110. Timing generator 102 provides pixel and scan line timing signals to the CCD driver 104, offset corrector 106, gain corrector 108, analog-to-digital converter 110. Digital image data is then directed onto a video data bus 120, controlled by video data bus driver 122, and eventually to output transceiver 130, where it is directed to other external devices in accordance with host interface bus driver 132 control. For certain purposes, video image data may also be directed into the image processing system, via output transceiver 130, which is a bi-directional device.

Timing generator 102 also provides scan line and pixel timing signals to calibration memory 140, which is this particular case may be an 8K×8 static RAM memory device. Correction values are directed from calibration memory 140 in accordance with timing signals from timing generator 102, to correction bus 142 from which correction data is directed to offset corrector 106 and gain corrector 108. Accordingly, correction data corresponding to each photosite is delivered to the correctors for each pixel in sequence. Timing generator 102 may be a programmable gate array device, controlled in accordance with a EEPROM device 146. Alternatively, timing generator 102 may be a masked gate array device, which does not require an external program storage. Calibration or correction data is also directed into calibration memory 140 from correction data bus 142, as will become apparent from the description below.

Microprocessor controller 150 includes program memory 152, which in this case is an 8K bit ROM device, and a scratch pad memory 154, in this case, a 256 byte RAM device. Microprocessor controller 150 produces data on three main buses: an address bus 156, a data bus 158, and a control signal bus 160. Control signal bus 160 receives control signals from the sensor group 168, including start of scan sensor 40 and CVT interlock switch (not shown), to provide mechanical control of the CVT. Control signal bus 160 receives control signals from a feeder solenoid, feeder sensor, and a feeder registration switch, illustrated as a single block 170. Control signal bus 160 provides control signals for operation of a lamp controller 172 for control of the illuminator 32, operation of an LED panel 174, and for motor controller 176 controlling motor 17. Microprocessor controller 150 may also provide control of timing generator 102.

On data bus 158, data produced or required by microprocessor controller 150 may be directed to and from external devices, via transceiver 180, which is connected for bi-directional data transmission to and from video data bus 120 and transceiver 130, in accordance with timing and control signals from timing generator 102 and microprocessor controller 150 directed to transceiver 180. Control signal bus 160 directs control signals for control of, and data bus 158 carries data to and from, transceiver 182, for calibration procedures, to be explained further hereinbelow.

Address bus 156 directs address information concurrently with control signals from control signal bus 160 and data from data bus 158, to an averager memory 184, as will be further explained hereinbelow. Address latch 185 is used to demultiplex the lower 8 address bits from data bus 158.

Figure 3:
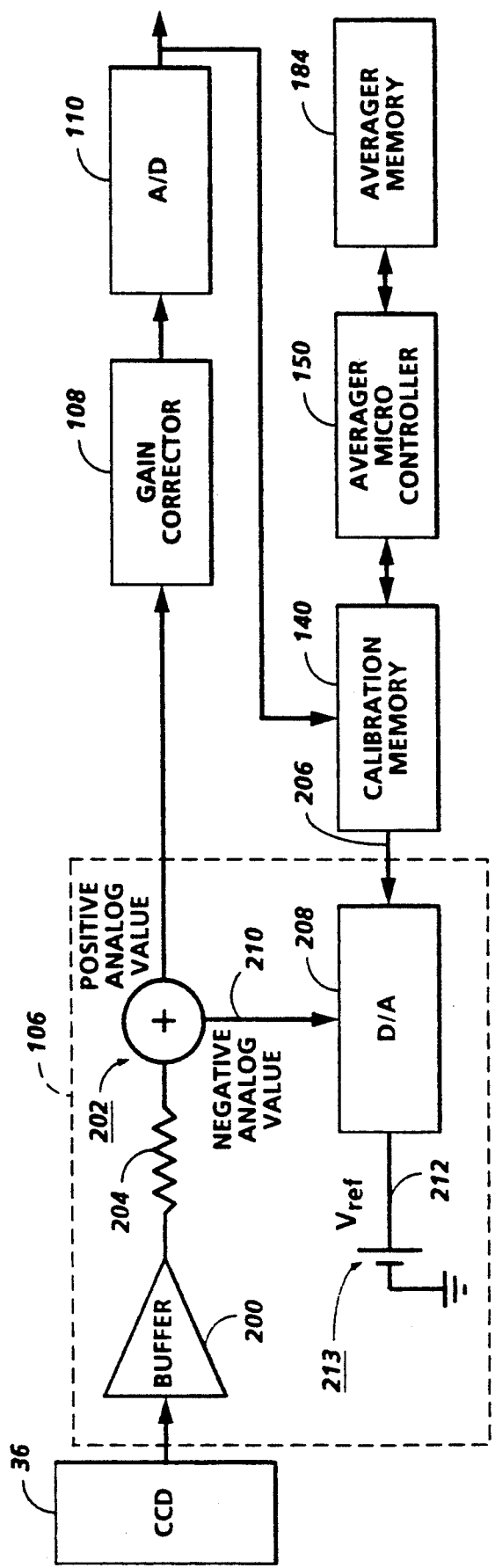
FIG. 3 illustrates the inventive offset correction arrangement.

In accordance with one aspect of the invention and as illustrated in FIGS. 2A, 2B and 3, analog pixel data directed to offset corrector 106 (indicated by dotted lines) is initially directed to buffer 200, which provides a high impedance load for the CCD sensor array preventing distortion of the CCD analog data, and subsequently to voltage summing network 202, including resistive device 204. The output of resistive device 204 is connected to the input of gain corrector 108, which in turn is connected to analog-to-digital converter 110. The output of analog-to-digital converter 110 is connected through a bus driver 144 to calibration memory 140. During calibration, one line at a time is written into calibration memory 140. Microprocessor 150 reads this line through transceiver 182 and adds it to the previous line stored in averager memory 184. When a preselected number of lines have been read and added together, microprocessor 150 averages the results and writes the average values for each photosite into calibration memory 140 via bus driver 144. During the calibration procedure, controlled by microprocessor 150 in accordance with a program stored at program memory 152, sensor array 36 looks at the calibration strip 42, with illuminator 32 in an OFF condition, for a convenient period corresponding to a number of scan lines of pixels, with 16 scan lines being a reasonable number. For each photosite of array 36, an averager 208 (where the averager is a discrete device, or as in this case, a function of the microprocessor 150 operating in accordance with a program stored in program memory 152) derives an average value for corresponding pixels produced at the photosite in each scan line derived over the calibration period and stored in averager memory 184, and stores the result in calibration memory 140. During normal operation of the scanner, this average value, which represents the offset correction value, is directed to digital input 206 of digital to analog (D/A) converter 208 in offset corrector 106, where the stored digital value is converted to an analog voltage, which is applied at the analog input 210 to the output of voltage summing network 202 and particularly the output of resistive device 204, as a sinking value in the summing network 202. A D.C. reference voltage $V_{ref}$ is applied to a reference input 212 of D/A converter 208, from D.C. source 213. Thus, the offset values stored at calibration memory is applied analog pixel data. By applying the offset to the analog data prior to conversion to digital data, dynamic range of the corrected data is maintained.

Figure 4:
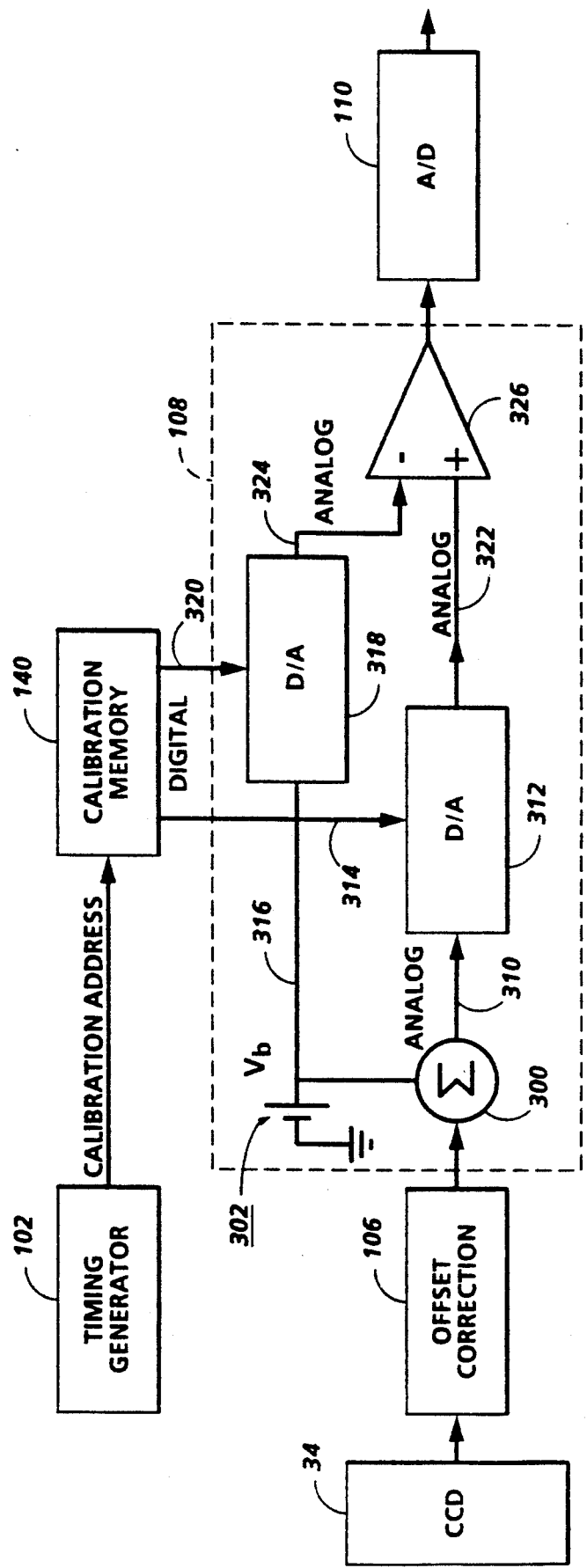
FIG. 4 illustrates the inventive gain correction arrangement.

With reference to another aspect of the present invention, and as illustrated in FIGS. 1 and 4, offset corrected analog pixel data from offset corrector 106 is directed to the input of gain corrector 108 (indicated by dotted line). During a calibration procedure, controlled by microprocessor 150 in accordance with a program stored at program memory 152, and subsequent to derivation of offset correction values, sensor array 36 looks at calibration strip 42, with illuminator 32 in an ON condition, for a convenient period corresponding to a number of scan lines of pixels. The response of each photosite is compared to a stored reference value, and a gain correction factor is obtained and stored at calibration memory 140. $V_b$, a bias voltage, is added at adder 300 to the analog pixel value from a D.C. source 302. The sum of bias voltage $V_b$ and the analog pixel data is directed to the reference voltage input 310 of first digital-to-analog (D/A) converter 312. Bias voltage $V_b$ has a value selected such that the magnitude of the maximum possible video signal (the greatest possible pixel value), and the bias voltage equal the maximum reference voltage allowed for the D/A converter. A digital correction value, stored at calibration memory 140 for each photosite, is directed to the digital input 314 of D/A converter 312 in accordance with a signal from timing generator 102. Bias voltage $V_b$ is also directed to the reference voltage input 316 of second D/A converter 318, while the same digital correction value is applied to the digital input 320 of D/A converter 318. The resulting analog output, 322 and 324, of each D/A converter 312, 318, respectively, is then a linear function of the correction value applied and the analog pixel input. For a pixel requiring a maximum correction value, for example 11111111 in an 8-bit system, the analog output is equal to the analog input. For a pixel requiring a minimum correction value, for example 00000000 in an 8-bit system, the analog output is 0. Between the minimum and maximum correction values, the relationship of the analog output to the analog input is generally linear. For very small values of the analog video signal, however, D/A converters tend to act non-linearly. The bias value $V_b$ is added to the video data to increase the value upon which the D/A converters are operating. Thus, the output of D/A converter 318 is subtracted from the output of D/A converter 312 at differential amplifier 326 so that:

output$_{D/A312}$ − output$_{D/A318}$ = gain corrected analog video because:

output$_{D/A312}$ = (bias + video) correction output$_{D/A318}$ = (bias) correction.

Therefore:

(bias + video)correction − (bias) correction = (video)correction.

The invention has been described with reference to a preferred embodiment. Obviously modifications will occur to others upon reading and understanding the specification taken together with the drawings. This embodiment is but one example, and various alternatives, modifications, variations or improvements may be made by those skilled in the art from this teaching which are intended to be encompassed by the following claims.

I claim:

1. An image scanning device having a scanning array with a plurality of photosites detecting light from an image, each photosite producing an analog response signal indicative of light intensity detected thereby, and gain correction means for correcting the gain of each analog response signal, comprising:

a memory storing digital gain correction values for each photosite;

first and second digital to analog converters, each converter having a reference input, a digital input and an analog output, and having an analog output response proportional to the value of signals directed to the reference input divided by the value of signals directed to the digital input;

a bias signal source, producing a predetermined bias signal;

means for algebraically combining the analog response signals and the predetermined bias signal;

said bias signal source, having a first connection to said reference input of said first digital to analog converter and directing said predetermined bias signal, and having a second connection to said algebraic combining means and directing the predetermined bias signal thereto;

said algebraic combining means directing an algebraic combination of said analog response signals and the predetermined bias signal to said reference input of said second digital to analog converter;

said memory storing digital gain correction values for each photosite, connected to said digital input of said first and second digital to analog converters, and controlled to deliver digital correction value signals thereto in accordance with the photosite from which the analog response signal was derived;

a difference deriving means, having first and second inputs, each input connected to one of the analog outputs of said first and second digital to analog converters, and operable on the analog output response therefrom, whereby a gain corrected analog response signal value is produced.

2. A method for correcting gain in an image scanning device having a scanning array with a plurality of photosites detecting light from an image, each photosite producing an analog response signal indicative of light intensity detected thereby, and gain correction means for correcting the gain of each analog response signal, including the steps of:

storing in a memory digital gain correction values for each photosite;

providing first and second digital to analog converters, each converter having a reference input, a digital input and an analog output, and having an analog output response proportional to the value of signals directed to the reference input divided by the value of signals directed to the digital input;

producing a predetermined bias signal;

algebraically combining the analog response signals and the predetermined bias signal;

directing the predetermined bias signal to said reference input of said first digital to analog converter;

directing the algebraic combination of the predetermined bias signal and the analog response signal to said reference input of said second digital to analog converter;

for each analog response, directing a corresponding digital correction value signals to said digital input of said first and second digital to analog converters from said memory storing digital gain correction values for each photosite;

deriving a difference between the analog output responses of said first and second digital to analog converters, whereby a gain corrected analog response signal value is produced.

3. An image scanning device having a scanning array with a plurality of photosites detecting light from an image, each photosite producing an analog response signal indicative of light intensity, and including means for producing a gain and offset corrected digital signal, comprising:

a memory storing digital gain and offset correction values for each photosite;

an offset correction digital to analog converter, having a digital input, and analog input, and reference input;

said memory connected to said digital input of said offset correction digital to analog converter and controlled to provide offset correction values thereto for each photosite response signal;

a signal summing network having an input to which analog response signals from the scanning array are directed, having a first output from which corrected analog response signals from the scanning array are produced, and having a second input connected to said analog input of said offset correction digital to analog converter;

said offset correction digital to analog converter converting said digital offset correction values for each photosite to analog correction signals applied to the signal summing network as sinking values;

first and second gain correction digital to analog converters, each converter having a reference input, a digital input and an analog output, and having an analog output response proportional to the value of signals directed to the reference input divided by the value of signals directed to the digital input;

a bias signal source, producing a predetermined bias signal;

means for algebraically combining offset corrected analog response signals and a predetermined bias signal;

said bias signal source, having a first connection to said reference input of said first digital to analog converter and directing a predetermined bias signal thereto, and having a second connection to said algebraic combining means and directing the predetermined bias signal thereto;

said algebraic combining means directing an algebraic combination of said analog response signals and the predetermined bias signal to said reference input;

said memory storing digital gain correction values for each photosite, connected to said digital input of said first and second digital to analog converters, and controlled to deliver digital offset correction values thereto in accordance with the photosite from which the analog response signal was derived;

difference deriving means, having first and second inputs, each input connected to one of the analog outputs of said first and second digital to analog converters, and operable on the analog output response therefrom, whereby a gain and offset corrected analog response signal value is produced; and analog to digital converter means for converting the gain and offset corrected signals to digital signals.

* * * * *